United States Patent
Rakozy et al.

(10) Patent No.: US 8,448,839 B1
(45) Date of Patent: May 28, 2013

(54) BRAZING METHOD USING BCUP AND BAG BRAZE ALLOYS

(75) Inventors: Kurt Allen Rakozy, Burnt Hills, NY (US); Jeffrey Michael Breznak, Waterford, NY (US); Andrew Batton Witney, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/428,012

(22) Filed: Mar. 23, 2012

(51) Int. Cl.
*B23K 9/00* (2006.01)
*B23K 35/12* (2006.01)
*B23K 35/30* (2006.01)

(52) U.S. Cl.
USPC ....... 228/135; 228/245; 228/262.61; 228/203

(58) Field of Classification Search
USPC .................................................. 228/245–255
See application file for complete search history.

(56) References Cited

U.S. PATENT DOCUMENTS

| | | | |
|---|---|---|---|
| 3,633,266 A * | 1/1972 | Taylor | 228/173.4 |
| 5,573,414 A | 11/1996 | Taillon et al. | |
| 5,793,010 A | 8/1998 | Nied | |
| 6,159,305 A | 12/2000 | Kliman et al. | |
| 6,345,433 B1 | 2/2002 | Kliman et al. | |
| 6,534,891 B2 | 3/2003 | Kliman et al. | |
| 6,577,038 B2 | 6/2003 | Butman et al. | |
| 7,451,906 B2 * | 11/2008 | Kisielius et al. | 228/56.3 |
| 7,735,718 B2 * | 6/2010 | Graham et al. | 228/262.51 |
| 8,196,801 B1 * | 6/2012 | Blaton | 228/103 |
| 2002/0079773 A1 | 6/2002 | Butman et al. | |
| 2003/0232132 A1 | 12/2003 | Muehlberger | |
| 2004/0035910 A1 * | 2/2004 | Dockus et al. | 228/56.3 |
| 2004/0038070 A1 * | 2/2004 | Dockus et al. | 428/652 |
| 2006/0027625 A1 * | 2/2006 | Dockus et al. | 228/56.3 |
| 2008/0099538 A1 | 5/2008 | DeBiccari et al. | |
| 2008/0160332 A1 | 7/2008 | Dighe et al. | |
| 2009/0140073 A1 * | 6/2009 | Thomson et al. | 239/128 |
| 2011/0259876 A1 | 10/2011 | Breznak | |

FOREIGN PATENT DOCUMENTS

GB 2394479 A 4/2004

* cited by examiner

*Primary Examiner* — Kiley Stoner
*Assistant Examiner* — Carlos Gamino
(74) *Attorney, Agent, or Firm* — James W. Pemrick; Ernest G. Cusick; Frank A. Landgraff

(57) ABSTRACT

A brazing method includes the steps of providing a first part and a second part, at least a first portion of the first part is configured to fit inside a second portion of the second part, preplacing a first self-fluxing braze alloy on one or more of the first portion and second portion, preplacing a non-phosphorous braze alloy on the first self-fluxing braze alloy, preplacing another layer of the first self-fluxing braze alloy on the non-phosphorous braze alloy, thermally treating at least one of the first portion and second portion, to create a temperature differential between the first portion and second portion, inserting the first portion into the second portion, and heating at least one of the first portion and second portion to melt both layers of the first self-fluxing braze alloy and the non-phosphorous braze alloy. The first portion is joined by brazing to the second portion.

18 Claims, 4 Drawing Sheets

BRAZING METHOD USING BCUP AND BAG BRAZE ALLOYS

BACKGROUND OF THE INVENTION

The invention described herein relates generally to brazing. More specifically, the invention relates to a method of brazing.

Armature stator bars in large generators are usually liquid cooled and contain a combination of individually insulated conductors, comprising both solid and hollow strands. The hollow strands are used to transmit liquid coolant, as well as electric current through the length of the armature stator bar. A header, including generator connection rings, must be leak resistant and capable of conducting electric current. This assembly is affixed to each end of each armature stator bar.

The headers and connection rings presently in service in generators serve as electrical connections between the stator bars or phase rings of the armature circuit and are also the sealed enclosure for transferring the liquid coolant to and from the stator bars. Conventional headers and connection rings are normally brazed to both the hollow and solid strands at each end of the stator bars. Thus, the liquid coolant is in direct contact with the brazed joints, which can result in liquid coolant leaks due to braze joint corrosion or braze joint imperfections. Ensuing leaks of liquid coolant can damage the armature insulation and result in costly maintenance outages.

Thus, there is a need for an improved brazing method that improves joint quality and reduces the leak problem.

BRIEF DESCRIPTION OF THE INVENTION

In an aspect of the present invention, a brazing method includes the steps of providing a first part and a second part, at least a first portion of the first part is configured to fit inside a second portion of the second part, preplacing a first self-fluxing braze alloy on one or more of the first portion and second portion, preplacing a non-phosphorous braze alloy on the first self-fluxing braze alloy, preplacing another layer of the first self-fluxing braze alloy on the non-phosphorous braze alloy, thermally treating at least one of the first portion and second portion, to create a temperature differential between the first portion and second portion, inserting the first portion into the second portion, and heating at least one of the first portion and second portion to melt both layers of the first self-fluxing braze alloy and the non-phosphorous braze alloy. The first portion is joined by brazing to the second portion.

In another aspect of the present invention, a brazing method includes the steps of providing a first part and a second part, at least a first portion of the first part configured to fit inside a second portion of the second part, preplacing a first self-fluxing braze alloy on one or more of the first portion and the second portion, preplacing a non-phosphorous braze alloy on the first self-fluxing braze alloy, preplacing another layer of the first self-fluxing braze alloy on the non-phosphorous braze alloy, thermally treating at least one of the first portion and the second portion, to create a temperature differential between the first portion and the second portion, inserting the first portion into the second portion when the temperature differential has reduced, and heating both the first portion and the second portion to melt both layers of the first self-fluxing braze alloy and the non-phosphorous braze alloy. The first portion is joined by brazing to the second portion.

DETAILED DESCRIPTION OF THE INVENTION

One or more specific aspects of the present invention will be described below. In an effort to provide a concise description of these aspects, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

A dynamoelectric machine is defined as a machine that converts mechanical energy to electrical energy or vice-versa, including but not limited to generators and motors. However, it is to be understood that the present invention could also be applied to turbomachines as well, or any application where an improved brazing method is desired.

A brazing method is herein described for joining two parts in a reliable manner. Brazing is generally defined as a joining process wherein coalescence is produced by heating to a suitable temperature above about 800° F. and by using a non-ferrous braze alloy, having a melting point below that of the materials to be joined.

Figure 1:
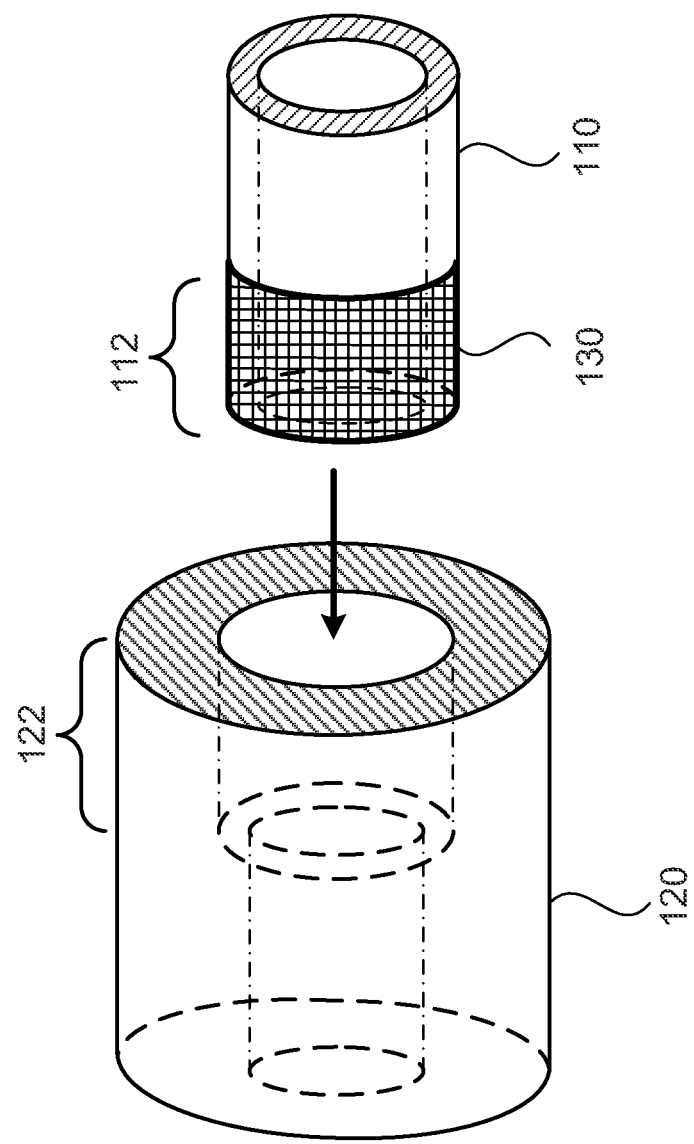
FIG. 1 illustrates a simplified perspective view of two parts before they are brazed together, according to an aspect of the present invention.

FIG. 1 illustrates a simplified perspective view of two parts needing to be joined together by brazing. The parts may be pipes, conduit or any other element for transporting a gas or fluid. A portion 112 of first part 110 is configured to fit inside a portion 122 of a second part 120. In one example, the first part 110 is a copper pipe having a first outer diameter (e.g., 1 inch). The second part 120, in this example, may also be a copper pipe or copper fitting, and the portion 122 may have an inner diameter about the same or slightly greater than the outer diameter of the first part 110 or first portion 112. For example, if the first part/portion has a 1 inch outer diameter, then the inner diameter of the second portion 122 might be about 1.004 inches to about 1.008 inches, resulting in a clearance gap of about 0.002 inches to about 0.004 inches, respectively. These dimensions are only exemplary and any suitable part dimensions and clearance gap may be used with the method of the present invention. The term "copper" may refer to copper or any predominantly copper-based alloy including, but not limited to, tough-pitch copper, oxygen-free copper, or silver-bearing copper (either tough-pitch or silver bearing).

In order to obtain high-quality brazed joints, the parts must be closely fitted, and the base metals must be exceptionally clean and free of oxides. In most cases, joint clearances of about 0.002 inches to about 0.008 inches are recommended for the best capillary action and joint strength. However, in some brazing operations it may be desirable to have joint clearances above or below this range. Cleanliness of the brazing surfaces and any preplaced braze alloy is also important, as any contamination can cause poor wetting (i.e., flow of the braze alloy), lack of adhesion to the parent metals, or unacceptable porosity in the resultant joint. The two parts 110, 120 can be joined by brazing and both portions of the joint should be clean. Two methods for cleaning parts prior to brazing, are chemical cleaning, and abrasive or mechanical cleaning. In the case of mechanical cleaning, it may be desirable to maintain a predetermined surface roughness as wetting on a rough surface occurs much more readily than on a smooth surface of the same geometry.

Figure 2:
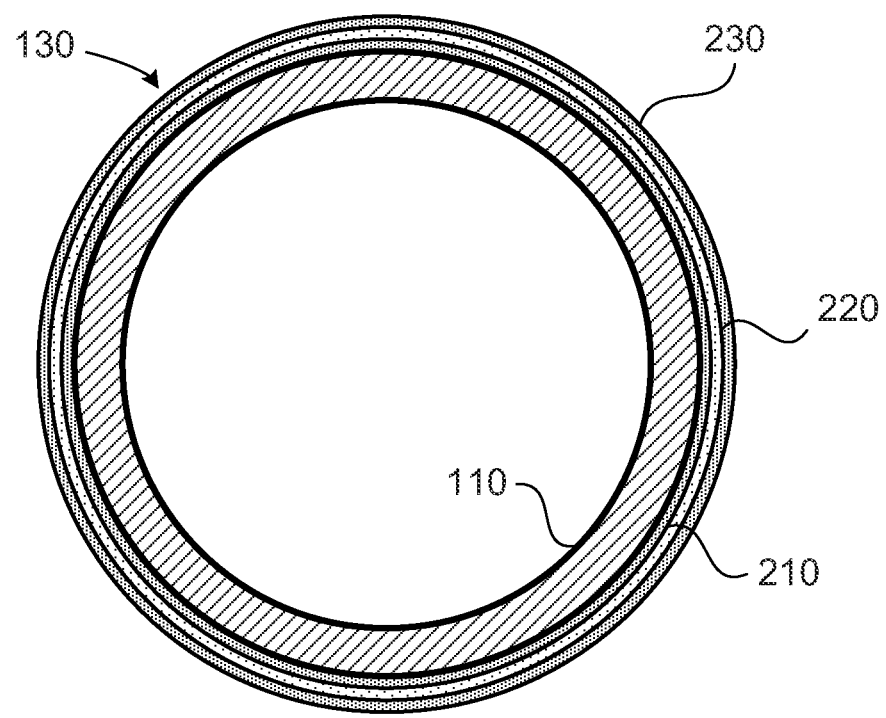
FIG. 2 illustrates a cross-sectional view of the first part coated with three layers of braze alloy, according to an aspect of the present invention.

Multiple braze alloy layers 130, are preplaced (or deposited) on one or both parts prior to brazing. For example, multiple braze alloy layers 130 are preplaced on the first portion 112 of the first part 110. Preplacing may include deposition, mechanical placement, chemical placement or any other suitable method for preplacing the multiple braze alloy layers 130. The braze alloy layers may be sheets, bands or strips of metal, or the braze alloy layers could be applied (preplaced) in a powder form by a cold spray deposition process. Referring to FIG. 2, at least a portion of the first part 110 (e.g., a copper pipe) is coated with a first self-fluxing braze alloy 210. The self-fluxing braze alloy 210 may be comprised of an alloy from the BCuP family of braze alloys, in which the phosphorus present in the alloy functions as a flux, removing copper oxides during brazing and allowing a well-adhered joint to form without the need for a separately applied flux and/or a reducing atmosphere. A second braze alloy 220 is preplaced (or deposited) on the first self-fluxing braze alloy 210. The second braze alloy 220 may be comprised of a non-phosphorous braze alloy and/or an alloy from the BAg family of braze alloys, which in the past have required either a brushed-on flux or reducing atmosphere to wet and adhere properly during copper brazing. Another layer or third layer of a self-fluxing braze alloy 230 is preplaced (or deposited) on the second braze alloy layer 220. As in the case of the self-fluxing braze alloy 210, the self-fluxing braze alloy 230 also functions as both a flux and braze alloy, and may also be comprised of a BCuP alloy. The two self-fluxing braze alloy layers may be preplaced or deposited by a cold spray deposition process or any other suitable application method as desired in the specific application. These other methods include but are not limited to preplacing the braze alloy layers in band, sheet, strip, or washer form.

Upon application of sufficient heat, the three braze alloy layers 210, 220 and 230 all melt. The phosphorus-bearing layers 210, 230 in contact with the copper, self-flux during brazing and give good adhesion to the parts. The phosphorus-free layer 220 in between dilutes the phosphorus-rich layers 210, 230 to minimize the residual presence of $Cu_3P$ phase in the joint, which is a metallurgical phase that can serve as a site for corrosive attack. The resulting brazed joint provides enhanced corrosion protection at the point of contact with flowing fluid (e.g., cooling water, or any cooling medium).

As a few non-limiting examples, the non-self-fluxing braze alloy may be a BAg-18 alloy that is comprised of silver (Ag), copper (Cu) and tin (Sn), and has a melting point of at about 1,115° F., has a liquidus temperature of about 1,325° F., and is typically brazed at temperatures above 1,325° F. A Bag-24 alloy may also be used as a non-self-fluxing braze alloy, and is comprised of silver (Ag), copper (Cu), zinc (Zn) and nickel (Ni), and has a melting point of about 1,220° F. and a liquidus temperature of about 1,305° F. It is to be understood that other non-self-fluxing braze alloys may also be used as desired in the specific application. The self-fluxing braze alloy may be BCuP-5, which contains about 15% silver, 5% phosphorus, a balance of copper, and has a liquidus temperature of around 1,475° F. A brazing method using a combination of these types of braze alloys may also be referred to as a fluxless brazing method.

The multiple braze alloy layers 130 may be preplaced on at least one of the parts to be joined. For example, the multiple braze alloy layers 130 can be preplaced on part 110 in the region (i.e., portion 122) of the joint. The second part 120 can be thermally treated by preheating to thermally expand the inner diameter of portion 122. For example, the second part 120 may be preheated by induction heating to a temperature of about 400° F. to about 500° F. Other heating methods (e.g., torch heating, furnace, carbon arc, resistance, etc.) and other temperature ranges above or below those listed may also be used as desired in the specific application. After the second part 120 is preheated and portion 122 has thermally expanded, the first part 110 can be inserted into the second part 120.

Alternatively, the first part 110 and/or first portion 112 can be thermally treated by cooling to contract or shrink the first part 110 and/or first portion 112. The thermal treatment (either heating and/or cooling) creates a temperature differential between the first portion and the second portion. For example, the first portion 112 may be immersed in a nitrogen bath. The nitrogen bath may comprise liquid and/or solid nitrogen, or mixtures thereof. In this aspect, the nitrogen bath shrinks or contracts the first portion, while also providing a benefit to the method of reducing oxide formation. At cooler temperatures, oxide formation on metals (e.g., copper) is greatly reduced (or effectively eliminated) compared to a method where the metal is heated. In other aspects of the present invention, a combined cooling of the first portion and preheating of the second portion may be employed to create a compressive fit-up between the two parts.

The two parts form a compressive type fit-up and the thermal expansion of the second part (and/or thermal contraction of the first part/portion) allows for easier insertion of the first part 120 (portion 112) into the second part 120 (portion 122). After the brazing operation and upon cooling of the respective parts, a strong, mechanical bond is formed between the two parts.

A heating step can be performed on both parts, and this can be performed by induction heating or other heating method (e.g., torch heating, furnace, carbon arc, resistance, etc.). The two parts 110, 120 (and/or portions 112 and 122) may be heated to about 1,200° F. to about 1,500° F., about 1,400° F. to about 1,550° F., or any other suitable temperature range as required by the melting point of the highest-temperature braze alloy preplaced in the joint region. The heating cycle melts the flux and/or braze alloy and the braze alloy distributes along the joint through capillary action. The braze alloy bonds to both parts and forms a seal preventing any undesired leaks in the joint.

Figure 3:
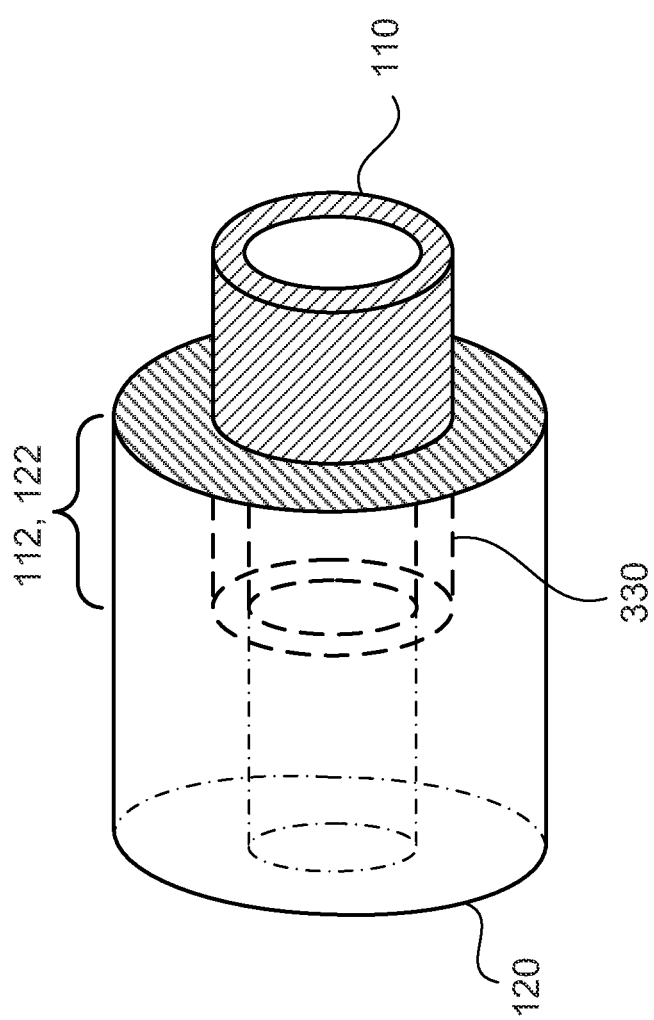
FIG. 3 illustrates a simplified perspective view of two parts after they are brazed together, according to an aspect of the present invention.

FIG. 3 illustrates a simplified perspective view of both parts after a brazing method, according to an aspect of the present invention. The first part 110 has been inserted into the second part 120 and both parts are joined or brazed together by joint 330.

Figure 4:
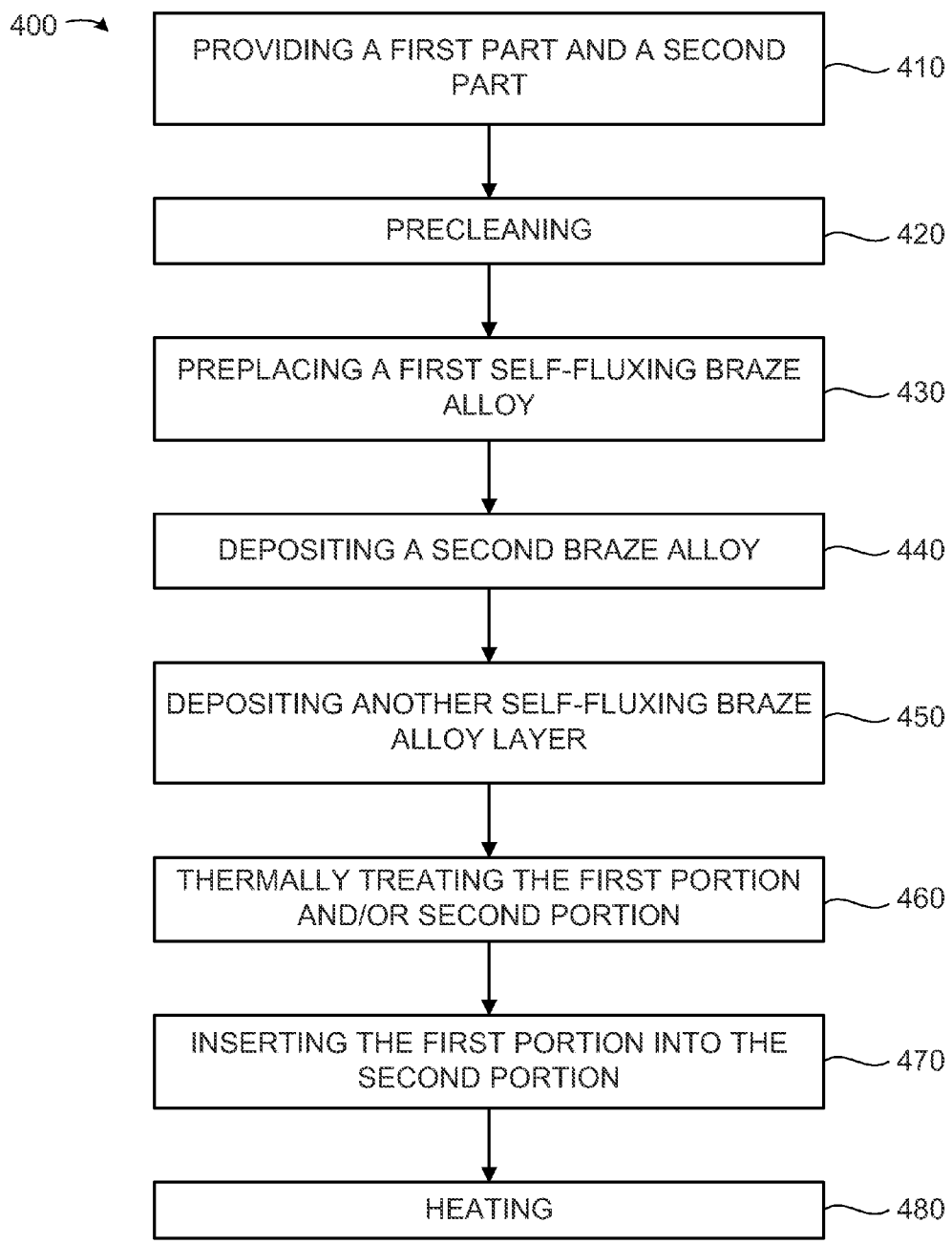
FIG. 4 illustrates a flowchart of a brazing method, according to an aspect of the present invention.

FIG. 4 is a flow chart of a brazing method 400 according to an aspect of the present invention. The brazing method 400 includes the steps of providing (step 410) a first part and a second part, where at least a first portion of the first part is configured to fit inside a second portion of the second part, a cleaning (step 420) that cleans the first portion of the first part and the second portion of the second part, and preplacing or depositing (step 430) a first self-fluxing braze alloy (first layer) on one or more of the first portion and the second portion, preplacing or depositing (step 440) a second braze alloy (second layer) on the first self-fluxing braze alloy, preplacing or depositing (step 450) another layer of the first self-fluxing braze alloy (third layer) on the second braze alloy, thermally treating (step 460) at least one of the first portion and the second portion to create a temperature differential between the first portion and second portion, inserting (step 470) the first portion into the second portion, and heating (step 480) at least one of the first portion and the second portion to melt both layers of the first self-fluxing braze alloy and the second braze alloy. Method 400 joins the first portion to the second portion by brazing. It is to be understood that more than three layers of braze alloys could be deposited, as desired in the specific application. A flux could also be applied if desired.

Method 400 may also include a step of providing an inert gas purge inside the second portion or an inert atmosphere in the area surrounding the joint. The thermally treating step 460 may be performed by induction heating, and one or both parts, or portions thereof may be heated to about 400° F. to about 500° F. The thermally treating step may also create a temperature differential between the first portion and the second portion of about 400° F. In addition, the thermally treating step may also cool the first portion to thermally contract the first portion, and this cooling step may be performed by immersing the first portion in a nitrogen bath. Alternatively, the temperature differential may be obtained by cooling the first portion and heating the second portion.

The heating step 480 may also be performed by induction heating, and one or both parts or portions thereof may be heated to about 1,400° F. to about 1,550° F. As a further advantage provided by the present invention, a cleaning step may be avoided so that one does not have to perform a cleaning step after the heating step. However, a cleaning step could be performed if desired.

Method 400 may also include the steps of providing the first part 110 made of copper and the second part 120 made of copper. A thermal expansion during the thermal treatment of the first part/portion and/or second part/portion provides a compression fitting (or fit-up) between the first portion 112 and the second portion 122 upon cooling (or temperature equilibration) of the first portion 112 and second portion 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A brazing method comprising:
providing a first part and a second part, at least a first portion of the first part configured to fit inside a second portion of the second part;
preplacing a first self-fluxing braze alloy on one or more of the first portion and the second portion, wherein the first self-fluxing braze alloy is a BCuP alloy;
preplacing a non-phosphorous braze alloy on the first self-fluxing braze alloy, wherein the non-phosphorous braze alloy is a BAg alloy;
preplacing another layer of the first self-fluxing braze alloy on the non-phosphorous braze alloy;
thermally treating at least one of the first portion and the second portion, to create a temperature differential between the first portion and the second portion;
inserting the first portion into the second portion;
heating at least one of the first portion and the second portion to melt both layers of the first self-fluxing braze alloy and the non-phosphorous braze alloy; and
wherein, the first portion is joined by brazing to the second portion.

2. The brazing method of claim 1, wherein at least one of the preplacing steps is performed by cold spray deposition.

3. The brazing method of claim 1, further comprising:
precleaning the first portion of the first part and the second portion of the second part.

4. The brazing method of claim 1, further comprising:
providing an inert gas purge inside the second portion before the heating step.

5. The brazing method of claim 1, wherein the thermally treating step is performed by induction heating.

6. The brazing method of claim 5, wherein the temperature differential is about 400° F.

7. The brazing method of claim 1, wherein the heating step is performed by induction heating, and the first portion and the second portion are heated to about 1,400° F. to about 1,550° F.

8. The brazing method of claim 1, wherein the thermally treating step further comprises:
cooling the first portion, to thermally contract the first portion.

9. The brazing method of claim 8, wherein the cooling step is performed by immersing the first portion in a nitrogen bath.

10. The brazing method of claim 1, further comprising:
not performing a cleaning step after the heating step.

11. A brazing method comprising:
providing a first part and a second part, at least a first portion of the first part configured to fit inside a second portion of the second part;
preplacing a first self-fluxing braze alloy on one or more of the first portion and the second portion, wherein the first self-fluxing braze alloy is a BCuP alloy;
preplacing a non-phosphorous braze alloy on the first self-fluxing braze alloy, wherein the non-phosphorous braze alloy is a BAg alloy;
preplacing another layer of the first self-fluxing braze alloy on the non-phosphorous braze alloy;
thermally treating at least one of the first portion and the second portion, to create a temperature differential between the first portion and the second portion;
inserting the first portion into the second portion when the temperature differential has reduced;
heating both the first portion and the second portion to melt both layers of the first self-fluxing braze alloy and the non-phosphorous braze alloy; and
wherein, the first portion is joined by brazing to the second portion.

12. The brazing method of claim 11, wherein at least one of the preplacing steps is performed by cold spray deposition.

13. The brazing method of claim 11, wherein the thermally treating step is performed by induction heating.

14. The brazing method of claim 13, wherein the temperature differential created by the thermally treating step is about 400° F.

15. The brazing method of claim 11, wherein the thermally treating step further comprises:
   cooling the first portion, to thermally contract the first portion.

16. The brazing method of claim 15, wherein the cooling step is performed by immersing the first portion in a nitrogen bath.

17. The brazing method of claim 11, wherein the heating step is performed by induction heating, and the first portion and the second portion are heated to about 1,400° F. to about 1,550° F.

18. The brazing method of claim 11, further comprising:
   not performing a cleaning step after the heating step.

* * * * *

UNITED STATES PATENT AND TRADEMARK OFFICE
CERTIFICATE OF CORRECTION

PATENT NO. : 8,448,839 B1
APPLICATION NO. : 13/428012
DATED : May 28, 2013
INVENTOR(S) : Rakozy et al.

It is certified that error appears in the above-identified patent and that said Letters Patent is hereby corrected as shown below:

In the Specifications

In Column 4, Line 5, delete "Bag-24" and insert -- BAg-24 --, therefor.

In Column 4, Lines 49-50, delete "first part 120" and insert -- first part 110 --, therefor.

Signed and Sealed this
Sixth Day of August, 2013

Teresa Stanek Rea
*Acting Director of the United States Patent and Trademark Office*